United States Patent [19]
Miller et al.

[11] 3,721,567
[45] March 20, 1973

[54] PRODUCTION OF LIVESTOCK FEED FROM SUGARCANE

[76] Inventors: Robert Boothe Miller, Montreal, Canada; C. Keith Laurie, Barbados Canada; C. Keith Laurie, Bridgetown, Barbados

[73] Assignee: Canadian Cane Equipment Ltd., Montreal, Quebec, Canada

[22] Filed: April 8, 1970

[21] Appl. No.: 26,598

[52] U.S. Cl. .................................99/2 ND, 127/42
[51] Int. Cl. .............................A23k 1/18, A23k 1/22
[58] Field of Search..................99/2 R, 6, 141, 9.8 E

[56] References Cited

UNITED STATES PATENTS

| | | | |
|---|---|---|---|
| 3,218,171 | 11/1965 | Taylor | 99/2 |
| 707,113 | 8/1902 | Hughes | 99/6 |
| 1,040,562 | 10/1912 | Roberts | 127/42 |

FOREIGN PATENTS OR APPLICATIONS

| | | | |
|---|---|---|---|
| 280,284 | 11/1927 | Great Britain | 99/2 |
| 217,107 | 2/1957 | Australia | 99/2 |

OTHER PUBLICATIONS

C. C. Culbertson, Feed Urea in Ruminant Nutrition, No. 348, July 1953.
S. H. Work, Feed Urea in Ruminant Nutrition, No. 174, May 1943.

*Primary Examiner*—Norman Yudkoff
*Assistant Examiner*—C. R. Bando
*Attorney*—Burns, Doane, Swecker & Mathis

[57] ABSTRACT

A process for sustaining livestock, e.g., ruminants such as cattle, is described which involves providing the livestock with a feed comprising sugarcane pith which contains a substantial amount of the naturally present sugar juice and which is substantially free from the highly lignified outer rind fibers of the sugarcane. This feed may also contain nitrogenous protein substituents such as urea, a leguminous meal, and various minerals. The sugarcane pith may be obtained by longitudinally opening sugarcane without expressing a significant amount of the sugar juice from the pith, and then separating the pith from the outer rind fibers while retaining substantially all of the sugar juice in the pith.

4 Claims, 1 Drawing Figure

PATENTED MAR 20 1973      3,721,567
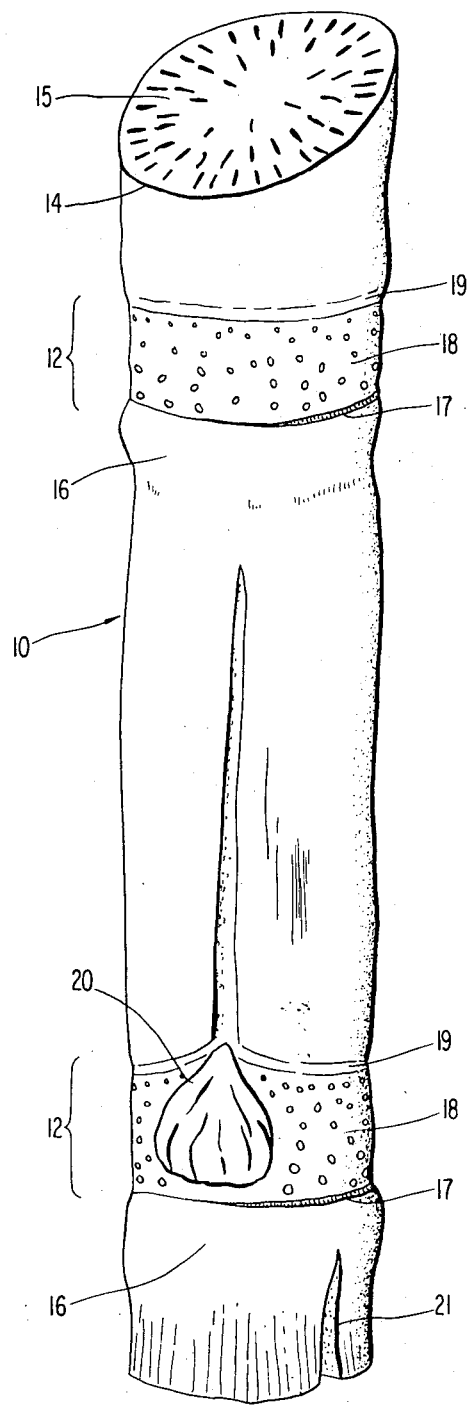
INVENTORS
ROBERT B. MILLER
C. KEITH LAURIE
BY Burns, Doane, Benedict,
Swecker & Mathis
ATTORNEYS

PRODUCTION OF LIVESTOCK FEED FROM SUGARCANE

BACKGROUND OF THE INVENTION

Field of the Invention

This invention relates to the manufacture and use of feed for livestock. More particularly, the present invention relates to a novel composition containing sugarcane pith for use as livestock feed and to processes for the preparation and use thereof.

Introduction

To feed the burgeoning world population, it is of importance that the efficiency of food production systems be improved through more efficient use of existing facilities, introduction of new types of crops and livestock, and development of new feed processing techniques.

Present trends of feeding livestock which are used for human food production are of concern because of the direct competition between feed for livestock and food for man, as illustrated by the large amounts of grain usually incorporated in livestock rations. Despite this competition, there is an almost indispensable place for livestock agriculture in the overall pattern of food production. Whereas in some instances, livestock do seriously compete with man, in many others they may not. This latter situation is exemplified by herbivorous animals, particularly ruminants, such as cattle, which possess digestive abilities that man does not.

A digestive characteristic of ruminants, which sets them apart from man, is their ability to digest cellulose. Critical to this ability is the presence of a multi-compartment complex stomach which through the presence of various micro-organisms hydrolyzes the chemical linkages of cellulose eventually producing energy and releasing plant cellular components which are also utilized by the animal.

Cellulose is the structural component of all plant cells and is the most widely distributed single organic compound in the plant kingdom. Dispite this abundance, only herbivorous animals, particularly ruminants, can utilize cellulose as a source of energy, since other species do not possess digestive facilities for the degradation of cellulose. Cellulase, the enzyme responsible for this degradation, is produced by micro-organisms which reside in the complex stomach of ruminants. The volatile fatty acids produced by these micro-organisms serve as the actual energy source for the host animal.

In the tropics, competition between man and livestock for food is not as severe as in temperate countries because the cereals have been grown essentially for human consumption and livestock such as cattle have been left to procure their requirements from other sources, including whole sugarcanes and sugarcane by-products.

Sugarcane, a giant member of the grass family, is widely grown in tropical countries for the production of sugar, mainly for export. This crop provides one of the cheapest forms of energy food, with the lowest unit of land area required per unit of energy produced. Although sugar does not provide a complete diet for man, it represents about one seventh of his total energy intake. As an efficient energy producer, it has been estimated that the energy produced by one acre under sugarcane is equivalent to that produced by seven acres under wheat, twenty acres under milk production and over one hundred acres under beef production. Despite the energy potential of sugarcane, however, its use in livestock feed has not been widely advocated and past attempts to utilize sugarcane and sugarcane by-products in livestock feed have been somewhat unsuccessful.

Summary of the Prior Art

Whole mature sugarcanes have been used in limited amounts for feeding to cattle. However, due to the high lignin content substantially increasing the rigidity of the outer rind, the digestive tract of the ruminant may be seriously harmed, e.g., punctured, by the sharp coarse nature of whole sugarcane stalks. Sugarcane tops have also been consumed by draft animals in the sugarcane fields, but the efficiency of their utilization is questionable owing to the coarse nature of the material which may also cause physical damage to the digestive tract of the animal.

Bagasse, the coarse fibrous residue of certain sugarcane juice extraction processes, is primarily used at the sugar factory as fuel for plant operations. Depending on the efficiency of the crushing operation, bagasse may vary in its content of sugars, although in any event such sugars represent a relatively small fraction of the bagasse. To livestock, bagasse is an unpalatable feedstuff when used alone but intake and energy content have been increased by the addition of molasses, another of the sugarcane by-products. Bagasse utilization by livestock is primarily limited by its high content of highly lignified material, e.g., the hard outer rind fibers, which disrupts the digestive systems of the livestock. Further, investigations have shown that it takes more energy to digest the bagasse than is obtained from it by the livestock.

Bagasse pith, another sugarcane by-product, is obtained by expressing the sugar juice from the sugarcane and screening out the hard outer rind fibers. Again, because it may take more energy to digest bagasse pith than is obtained from it, molasses has been mixed in with the bagasse pith. See, for example, U.S. Pat. No. 707,113.

Whether sugarcane or sugarcane by-products be used, additional nitrogenous ingredients are usually added to the feed as supplementary protein substituents, urea being the most common nitrogenous protein substitute used. A drawback, however, is that urea has been found to have a toxic effect on livestock where too high a proportion is used in the feed.

SUMMARY OF THE INVENTION

Accordingly, a primary object of the present invention is to provide an improved livestock feed from sugarcane which feed substantially prevents or alleviates one or more of the disadvantages of the prior art as discussed above.

Another object is to provide a process for sustaining livestock with a feed composition which has a high energy content and is adequate as a sole dietary constituent, which is highly palatable, and which is easily digestible.

A further object is to provide a livestock composition which allows higher levels of urea to be incorporated therein without toxic effects on the livestock.

A further object is to provide a process for preparing such livestock compositions from sugarcane.

These and other objects of the present invention will become apparent with reference to the following summary of the invention and the description of preferred embodiments thereof:

According to the present invention, a process is provided for sustaining livestock which involves providing or supplying the livestock with a feed composition comprising sugarcane pith which contains a substantial amount of the naturally present sugar juice, i.e., a substantial amount of the sugar juice originally occurring in the pith is retained in the pith. Further, this sugarcane pith is substantially free from the highly lignified outer rind fibers of the sugarcane and is not disruptive of the digestive systems of livestock.

In another aspect of the present invention, this sugarcane pith is combined or mixed with nitrogenous protein substitutes such as urea to provide an even better feed. Surprisingly, it has been found that nitrogenous protein substitutes such as urea may be mixed with the sugarcane pith in higher proportions than in previous feeds without toxic effects on the livestock.

In yet another aspect of the present invention, a process is provided for preparing or producing livestock feed compositions from sugarcane comprising longitudinally opening or splitting the sugarcane stalk without expressing a significant amount of sugar juice from the pith, separating the pith from the highly lignified outer rind or rind fibers while retaining substantially all of the sugar juice in the pith, and then adding to the separated pith a nitrogenous protein substitute such as urea.

These and other aspects and advantages of the present invention will be more fully appreciated in view of the following description of the preferred embodiments and the accompanying drawing.

BRIEF DESCRIPTION OF THE DRAWING

The drawing pictorially illustrates a section of sugarcane and its various components.

DESCRIPTION OF THE PREFERRED EMBODIMENTS

The drawing shows a typical section of sugarcane stalk. This portion of the stalk 10 has two modes 12, the part therebetween being an internode. The outer rind fiber region 14 of the internode is hard, highly lignified, and is comprised primarily of interconnected fibrovascular bundles. A thin epidermis, mostly thin, fine fibers, covers the rind and clings loosely to the stronger and larger fibrovascular bundles. The interior 15 of the stalk is mainly soft pith that contains most of the sweet natural sugar juice. The exterior of the mature internode is usually covered with a thin film of waxy bloom or cutical wax, as it is frequently called. Wax is also found throughout the rind as well as on the surface. A ring 16 beneath the node 12 contains a high concentration of wax. A band 17 above the wax ring 16 is called the leaf scar. A root band 18 is a small section of the node just above the leaf scar 17 that usually differs in color from the internode and has many small dots. Under favorable moisture conditions, a root may develop at each dot, should the section of stalk 10 be placed in the ground. Just above the root band 18, and not usually clearly distinct from it is a transition area known as the growth ring 19. Elongation and growth of the internode takes place in this area. A bud 20, when exposed to favorable moisture and temperature conditions and with proper stimulus, can develop into a new shoot. Expansion of the diameter of the stalk 10 may result in growth cracks 21 which may extend inwardly through the rind. Smaller barely distinct, corky cracks may develop along the internode and separate the fibrous material of the rind for short distances.

The particular composition of sugarcane may vary according to the particular species, as well as soil conditions, climate, and modes of cultivation. For example, sugarcane stalk may average from about 8 to 16 percent dry fiber and from 84 to 92 percent water and soluble solids (mostly sugars). Further, the pith may constitute from 75 to 80 percent of the cane stalk and may contain about 16 to 18 percent sugars (mostly sucrose, with some glucose and fructose).

As stated above, the separated sugarcane pith utilized in the present invention contains a substantial amount of naturally present sugar juice and is substantially or essentially free from highly lignified outer rind fibers.

Preferably, the separated sugarcane pith has retained enough of the sugar juice such that the pith comprises above about 10 percent sugars. Most preferably, the sugarcane pith contains substantially all of its original sugar juice. When stored over a period of time, the separated pith may lose some of its water content due to evaporation and some of its sugar content due to chemical decomposition. These losses, however, are normally negligible with respect to the function of the pith as a feed for livestock.

The sugarcane pith utilized in the present invention is preferably separated from the hard outer rind of the sugarcane stalk by longitudinally opening or splitting the stalk without expressing a significant amount of sugar juice from the pith, and thereafter separating the pith from the outer rind fibers while retaining substantially all of the sugar juice in the pith.

The splitting of the stalk and separation of the pith is preferably achieved using the methods and apparatus described in one or more of the following United States patents and patent applications, all of which are incorporated herein by reference: U.S. Pat. Nos. 3,424,611, 3,424,612, 3,464,877 and 3,464,881; U.S. Patent applications Ser. No. 692,185, filed Dec. 20, 1967, Ser. No. 692,237, filed Dec. 20, 1967, and Ser. No. 714,896, filed Mar. 21, 1968 now U.S. Pat. Nos. 3,567,510, 3,566,944 and 3,567,511 respectively. As described therein, the splitting of the stalk and separation of the pith involves handling the sugarcane stalks individually rather than in bulk as is done in conventional whole cane milling operations where masses of randomly oriented sugarcane are delivered in bulk to massive machinery that cuts, crushes, shreds and breaks the whole cane stalk, and under high pressure forcefully squeezes out the natural sugar juices.

For example, the sugarcane pith utilized in the present invention may be obtained by positively feeding an aligned stalk against a stalk splitting or cutting edge which opens the stalk up longitudinally, and then brushing, scraping, scooping, or milling the pith away from the exposed inner portion or side of the split stalk. These operations are performed without any effective squeezing or compressing of the pith so that the sugar juice may be retained in the pith. The means or apparatus for performing these operations are not a part of the present invention and thus for sake of brevity are not described further herein. For a more detailed discussion of the separation process and apparatus, reference may be made to the above listed U.S. patents and patent applications.

Because of the high-energy content of the uncompressed sugarcane pith, it may be suitably used in accordance with the instant invention as the sole feed to sustain or maintain livestock, e.g., ruminants such as cattle and sheep.

Additional dietary supplements, however, may be added to the sugarcane pith to enhance its use as a livestock feed.

An example of a particular nutrient which may be added to the uncompressed sugarcane pith to increase the nutritive value of the pith in a livestock feed is a nitrogenous protein substitute which can be converted into protein by the livestock. That is, a limiting factor in the utilization of roughage by ruminants such as cattle may be an inadequate supply of nitrogen with which to satisfy the growth requirements of the microbial population of the ruminant's complex stomach. Although many non-protein nitrogenous compounds may be used to fulfill this need, urea is most frequently used.

Cases of urea toxicity have been known to result where high concentrations of urea were used in the livestock feed ration. The present invention, however, allows higher levels of urea to be incorporated into the livestock feed than heretofore possible with no noticeable toxic or other adverse effect upon the animals involved. For example, urea may be incorporated into the feed in amounts of about 1 to 30 percent, preferably 1 to 20 percent, and most preferably about 5 to 15 percent.

To supplement the urea which is ultimately converted into protein nitrogen, other protein supplements may be added to the livestock ration. For example, brewery by-products cotton-seed and coconut oil or legumes such as soybeans, clover, alfalfa, peas, peanuts. and beans, may be added as a meal or in some other suitable form, and in amounts of about 10 to 90 percent. preferably about 40 to 80 percent.

Mineral supplements may also be added to the livestock ration, for example, as salts in a dry mix to facilitate ease and convenience of handling and use. These mineral supplying salts may include necessary anions such as the chlorides, bromides, iodides, sulphates, phosphates, nitrates, carbonates and the like. of various elemental substances necessary to promote proper growth and function. Similarly, the necessary metallic and non-metallic elements such as sodium, potassium, calcium, iron, copper, phosphorous, sulfur, nitrogen, and the like may also be added in an appropriate form. The mineral supplement may be present in the feed in amounts of about 5 to 50 percent. and preferably from 10 to 30 percent. For example. a suitable mineral mix may contain 10 to 20 percent calcium, 5 to 10 percent phosphorous, 25 to 50 percent sodium chloride, and from about .001 to 2 percent iodine Additional nutrients which may be mixed with or added to the composition of the instant invention include vitamins which are biochemically necessary to maintain growth and functioning of organic tissue. Particular vitamins include, among others, vitamin A, necessary to maintain the integrity of epithelial tissue, vitamin B, which aids in preventing pernicious anemia, vitamin $B_{12}$, riboflavin, thiamine, and vitamins C, D, and E, to name only a few.

Of course, other ingredients may be added to the livestock feed composition of the present invention to modify it without departing from the spirit and scope of the invention. For example, various liquid or semi-liquid additives can be used to enable the feed to be pressed into pellets, bars, or cakes to facilitate handling. If desired, additional natural or artificial flavors may be added to further increase the palatability of the feed. Various other curative or preventive compounds or compositions may also be added to the feed, such as drugs or medicines in the form of powders, granules, tablets, or liquids of varying viscosity. Similarly, other compounds may also be added to or mixed with the feed to obtain desired effects on the livestock.

The invention is further illustrated by the following examples; all parts and percentages in the examples and throughout the specification are by weight unless otherwise indicated.

EXAMPLE I

The following example was conducted at an altitude of approximately 1200 feet above sea level with the temperature during this period varying between an average minimum of 72° F and average maximum of 88° F. The average monthly rainfall was 5.28 inches with the highest 6.65 inches.

Six of the cattle used in this run were Senepol steers (derived from breeding ¾ Senegal and ¼ Red Poll) which represent livestock with beef producing potential, cross-bred for tropical conditions. The Senepol Steers were in good condition at the beginning of the run and ranged in weight from 200 to 402 pounds. The remaining steers used in the run were Holstein and represent livestock essentially bred for milk production under tropical conditions. These Holstein steers were from 4 to 8 months old and weighed from 160 to 206 pounds with a physical condition somewhat below that of the Senepol steers.

The steers used in run were housed individually to enable separate feeding and watering.

The first portion of the run involved an intensive feeding period consisting of 77 days. Two different rations were tested on the steers. Four steers of each breed were placed on a supplemented fresh sugarcane pith feed or ration, and two others were placed on a control consisting of a dairy ration and a citrus pulp ration. During these 77 days, the steers were penned separately and individually fed and watered. Initially, the steers were fed once a day but during the last month of the period, the steers consuming the most feed were fed twice a day. The sugarcane pith leftover from the previous day's feeding was always discarded. The weight of each steer was determined during the entire 77-day period.

The second phase of the run involved an extended feeding period of 21 days wherein the pen partitions in the livestock shelters were removed and the ten steers, i.e., the eight formerly on the sugarcane pith supplemented ration, plus the two Senepol steers formerly on the control ration, were group fed the sugarcane pith supplemented ration for the entire time. This extended feeding period was used to determine what effect individual versus group feeding might have on livestock performance. The steers were weighed at the beginning and the end of the 20-day interval although no data was collected on individual feed consumption during this period.

The sugarcane pith used in the supplemented feed ration was obtained daily from mature sugarcane stalks which normally would be used for sugar production. The stalks were first split down the middle into halves and each fed through a separator similar to that disclosed in U.S. Pat. application Ser. No. 692,185, filed Dec. 20, 1967, listed above. Using this particular method and apparatus, the pith was milled away from the split stalk portions and obtained with substantially all of the sugar juice originally contained therein and was in the form of a fluffy or flocculant mass free from the highly lignified outer rind fibers and any waxes.

A supplement of the following compositions was fed to the livestock at a rate of 2 pounds and 1 pound per animal per day to the Senepols and the Holsteins, respectively:

|  | Percent |
|---|---|
| Soybean Meal (44% Protein) | 67 |
| Urea 6.25 = 262% Crude Protein) | 13 (42% Nitrogen X |
| Mineral Mix (Purina) | 20 |

The approximate composition of the mineral mix as noted by the manufacturer was substantially as follows:

| | |
|---|---|
| Calcium | 13–15 |
| Phosphorous (not less than) | 6.5 |
| Iodine (not less than) | 0.0006 |
| Sodium Chloride | 40–45 |

A Vitamin A pre-mix (10.00 International Units/gram) was added at a rate of 0.50 grams per 450 grams of supplement. The supplement was prepared fresh daily and mixed into the top one-third of the sugarcane pith which was fed ad libitum to the steers, i.e., the steers were fed as much sugarcane pith as they desired.

The control animals were fed a combination of a commercial dairy ration at 4 pounds per day and a dried citrus pulp which was fed ad libitum, i.e., as desired. The commercial dairy ration comprised 16 percent minimum crude protein including not more than 5 percent equivalent crude protein from urea, 2.3 percent minimum crude fat and 14 percent maximum crude fiber according to the manufacturers specification.

For the greater part of the period, the weights of the two largest Senepol steers were estimated with a calibrated tape measure (e.g., a Weight Band, distributed by Cooper, McDougall and Robertson, Ltd., Berkhamstead, Herts, England) because of their large size which precluded the use of a weighing scale. The body weight changes of the steers during the first 77-day period of the test are summarized in Table I and Table II. The body weight gain of the Senepol steers was almost twice the rate gain of the Holstein steers when fed the sugarcane pith supplemented ration. A possible explanation for the difference in rates of gain between the two breeds might be attributed to the heavier initial weight of the Senepol steers as well as the reduced intake of ration by the Holstein steers (Table I) and their generally poorer pre-trial condition.

TABLE I

| | Sugarcane Pith | | Control |
|---|---|---|---|
| | Holstein | Senepol | Senepol |
| Number of steers | 4 | 4 | 2 |
| Av. Initial Wt. (lbs.) | 181 | 277 | 301 |
| Av. Final Wt. (lbs.) | 236 | 383 | 340 |
| Av. Total Gain (lbs.) | 55 | 106 | 39 |
| Av. Daily Gain (lbs.) | 0.71 | 0.31 | 0.51 |
| Daily Feed Consumed | | | |
| Sugarcane Pith, lbs. | 16.4 | 25.2 | |
| Supplement, lbs. (as fed) | 1.0 | 1.9 | |
| Citrus Pulp, lbs. (as fed) | | | 3.0 |
| Dairy Ration, lbs. (as fed) | | | 3.4 |
| Total (as fed) | 17.4 | 27.1 | 6.4 |
| Feed Efficiency (As Fed) | 27.6 | 19.9 | 12.4 |

TABLE II

Liveweight changes of steers during 77-day period (pounds)

| Steer No.[1,2] | Ration | Initial Wt. | Final Wt. | Total Gain | Daily Gain |
|---|---|---|---|---|---|
| S1 | Sugarcane Pith | 354 | 489 | 135 | 1.75 |
| S2 | Sugarcane Pith | 234 | 318 | 84 | 1.09 |
| S3 | Sugarcane Pith | 246 | 356 | 110 | 1.42 |
| S4 | Sugarcane Pith | 274 | 370 | 96 | 1.25 |
| S5 | Control | 200 | 208 | 8 | 0.10 |
| S6 | Control | 402 | 472 | 70 | 0.91 |
| H1 | Sugarcane Pith | 178 | 248 | 70 | 0.91 |
| H2 | Sugarcane Pith | 170 | 208 | 38 | 0.49 |
| H3 | Sugarcane Pith | 172 | 208 | 36 | 0.47 |
| H4 | Sugarcane Pith | 206 | 282 | 76 | 0.98 |

[1]S - Senepol steers
[2]H - Holstein steers

Table III and Table IV illustrate the body weight changes of the animals during the second phase of the trial, i.e., the additional 21-day period. Values show that steers fed the sugarcane pith supple-mented ration under feed-lot conditions achieved even higher rates of gain than when individually pen fed.

TABLE III

Weight changes during additional 21-day period (pounds)

| | 6-Senepols | 4-Holsteins |
|---|---|---|
| Av. Initial Wt. (Aug. 31st) | 369 | 236 |
| Av. Final Wt. (Sept. 20th) | 407 | 254 |
| Av. Total Gain | 38 | 18 |
| Av. Daily Gain | 1.81 | 0.86 |

TABLE IV

Weight changes of steers on sugarcane pith ration over additional 21-day feeding period (pounds)

| Steer No.[1,2] | Initial Wt. | Final Wt. | Total Gain | Average Daily gain |
|---|---|---|---|---|
| S1 | 489 | 538 | 49 | 2.29 |
| S2 | 318 | 348 | 30 | 1.43 |
| S3 | 356 | 389 | 33 | 1.56 |
| S4 | 370 | 413 | 43 | 2.05 |
| S5 | 208 | 248 | 40 | 1.89 |
| S6 | 472 | 507 | 35 | 1.66 |
| H1 | 248 | 270 | 22 | 1.05 |
| H2 | 208 | 238 | 30 | 1.43 |
| H3 | 208 | 230 | 22 | 1.05 |
| H4 | 282 | 280 | −2 | |

[1]S - Senepol steers

³H - Holstein steers

For purposes of comparison, tropical cattle under grazing conditions, on good feed at the best time of year, generally realize satisfactory weight gains of approximately 0.75 pounds per day.

Thus, it can be seen that fresh sugarcane pith is very satisfactory when used in a ration as the main source of energy for livestock.

In summary, comparing the daily average weight gains made by the Senepol steers in both the 77-day and 21day periods, with that obtained under existing systems of cattle rearing in the tropics, it can be seen that production on a sugarcane pith based ration is superior to that normally obtained.

EXAMPLE II

This example was conducted under substantially the same climate conditions as Example I.

Eight mature indigenous male sheep weighing between 40 and 60 pounds were used in this example. The animals were kept in individual cages to enable total excrement collection and voluntary intake determinations.

The first phase of the run consisted of feeding the sheep the same composition as that fed to the steers in Example I; namely, sugarcane pith and 200 grams of supplement fed ad libitum. The actual 7-day test period employed to obtain the desired values followed a five-week adaptation period wherein the animals were all fed the sugarcane pith ad libitum with an increasing supplement mix which eventually attained the 200 gram level. The second phase consisted of the ad libitum feeding of sugarcane pith and 100 grams of supplement to the test animal for 7 days. Immediately following a 7day adaptation period during which the animals were given time to accustom themselves to the dietary variation, the supplement level was reduced in the second phase of the run in order to determine whether the nutrients other than those supplying energy were limiting the utilization of the sugarcane pith. Digestibility and voluntary intake values for the ration were determined for both phases of the test.

The sugarcane pith and supplement were prepared as described in Example I, with the supplement mix for each sheep pre-weighed and individually packaged. Both feed and water were constantly available to all of the sheep. Feed consumption was determined daily wherein the amount of feed available on each successive day was 10 percent in excess of the previous day's consumption per animal. Feed samples were also chemically analyzed on a daily basis. Provisions were also made for collection of animal excrement daily during each of the 7-day test periods for chemical analysis. The animals were weighed before and after excrement collection to obtain data for calculating the Relative Intake of the ration. The sheep became adapted to their new environment and feed rather quickly and did not exhibit any ill effects during the trial.

Chemical analyses (Table V) were conducted for dry matter and crude protein content of both the feed and the excrement samples according to procedures of the Association of Official Agricultural Chemists (Official Methods of Analysis - 10th Edition, 1965). The crude protein content was calculated after a determination of nitrogen by the Kjeldal method followed by multiplying the value obtained by 6.25. The cellulose content of both the feed and the excrement was determined by a method as described by Donefer et al, Journal of Animal Science. 19, 545. An oxygen bomb calorimeter was used to determine the gross energy content of the feed and the excrement samples.

The chemical analysis of the feed used is set forth below in Table V.

TABLE V

Chemical analysis of components of ration

| Ingredient | Dry Matter % | Gross Energy k.cal/gm | Crude Protein % | Cellulose % |
|---|---|---|---|---|
| Sugarcane pith | 91.9 | 4.25 | 1.5 | 17.5 |
| Supplement mix | 87.3 | 3.44 | 70.9 | 8.0 |

From Table V it may be noted that the cellulose content of the sugarcane pith is higher than that normally found in grain seeds, such as corn, barley, oats, etc.

The relatively low gross energy value of the supplement mix is a result of the addition of mineral components which are non-energy containing materials. The high crude protein content reflects the urea contained in the supplement which has the equivalent of over 250 percent crude protein. The value for the cellulose content is somewhat higher indicating a contribution by the soybean meal which contains about 10 percent cellulose.

The apparent digestibility coefficients of dry matter, gross energy, crude protein and cellulose were calculated using the following formula:

Coefficient of digestibility (%) =

$$[(F_o \times A_o) - (F_t \times A_t)]/(F_o \times A_o) \times 100$$

where $F_o$ = grams of feed consumed
$F_t$ = grams of excrement
$A_o$ = percentage nutrient in feed
$A_t$ = percent nutrient in excrement
(nutrient relates to dry matter, crude protein, cellulose or kilocalories of gross energy per gram, with all data converted to dry matter basis)

The digestibility coefficient is a function of the efficiency of the animals' digestive system, while the gross energy is that total energy theoretically available for digestion from a feed ration.

The Relative Intake of each feed was calculated from the following formula:

Relative Intake = (Observed intake)/$80(W^{0.75}_{kg}) \times 100$ where ($W_{kg}^{0.75}$) is the metabolic body size of the animal which takes into account the animal's weight.

The Nutritive Value Index (NVI) for feeds is then calculated by multiplying the Relative Intake of the feed by its percent gross energy digestibility.

N.V.I. = Relative Intake × gross energy digestibility, %

Relative Intake (RI) is a measure of voluntary intake and is compared to that of standard high-quality forage. The Nutritive Value Index (NVI) is an index of feed nutritive value, which is the product of the relative intake and the gross energy digestibility of a particular feed composition. It is used as a measure of the digestible energy intake potential of the ration.

Values for the Apparent Digestibility of dry matter, gross energy, crude protein and cellulose, as well as Relative Intake and Nutritive Value Index, are summarized in Table VI.

TABLE VI

Summary of apparent digestibility values, Relative Intake, and Nutritive Value Index of sugarcane pith supplemented ration fed to sheep

| | Level of Supplementation | |
|---|---|---|
| | 100 gm | 200 gm |
| | Apparent Digestibility (%) | |
| Dry matter | 77.2 | 77.6 |
| Gross energy | 76.1 | 76.8 |
| Crude protein | 71.8 | 80.8 |
| Cellulose | 57.1 | 59.6 |
| Relative Intake | 84.9 | 99.2 |
| Nutritive Value Index | 64.7 | 76.2 |

These values indicate that all the components under investigation are adequately digested and that the metabolic utilization of the energy from the sugarcane pith was not limited by nutrient deficiency. The high value of cellulose digestibility if of particular interest in that it suggests the cellulose utilization was not appreciably limited by a lignin complex. Further, the Relative Intake Value of 99.2 observed for the sugarcane pith feed at the 200 gm. supplement level is essentially the same as that of high quality legume forage such as alfalfa or clover hay.

The slight increase in cellulose digestibility at higher supplementation levels may be attributed to increased microbial activity in the animals digestive system. This is based on the assumption that the increased nutrient contribution at a higher supplementation level may have acted as a stimulant to the micro-organisms responsible for cellulose degradation.

The availability of the gross energy of the sugarcane supplemented ration (approximately 75 percent is on the order of that observed for high-quality grain such as barley. It should be noted, however, that the digestibility values presented represent contributions by both the sugarcane pith and the supplement components of the ration. In spite of this, these energy values can be largely attributed to the sugarcane pith since it comprises approximately 85 percent of the entire ration. In fact, the energy availability of the sugarcane pith alone should be higher than that reported for the mixture since the supplement to which it is added would not be considered a good source of energy.

The weight gains of the sheep on each of the feeding schedules over the 7-day trail periods are tabulated in Table VII. The results indicate that the animals gained more on the higher level of supplementation. The results also indicate the effect of a superior nutrient contribution resulting in increased weight.

TABLE VII

Live weight changes[1] of sheep on rations over 7-day test periods

| | Level of Supplementation | |
|---|---|---|
| | 100 gm | 200 gm |
| Av. Total Gain (grams) | 269 | 766 |
| Av. Daily Gain (grams) | 38.4 | 109.4 |

[1]values represent average of eight sheep

EXAMPLE III

Under substantially the same climate conditions as in Example I, a young Holstein bull was over a period of about 4 weeks feed ad libitum nothing but sugarcane pith. The pith was prepared as described in Example I except that no supplement whatsoever was used. The bull remained healthy and suffered no noticeable ill effects during the feeding period. When the bull was butchered, the digestive tract looked healthy and normal, with no signs of punctures or other ill effects.

The principles, preferred embodiments, and modes of operation of the present invention have been described in the foregoing specification. However, it should be understood that the invention which is intended to be protected herein may be practiced otherwise than as described without departing from the scope of the appended claims.

What is claimed is:

1. A process for producing livestock feed from sugarcane, the sugarcane having as components a highly lignified outer rind region including outer rind fibers, epidermis and wax covering the outer rind region, and an interior of pith containing naturally present sugar juice, which process comprises:
   a. splitting sugarcane stalk parallel to a longitudinal axis of the stalk while retaining substantially all of the naturally present sugar juice in the pith;
   b. scraping the pith away from the highly lignified outer rind region including the outer rind fibers, epidermis, and wax of the stalk while retaining substantially all of the naturally present sugar juice in the pith; and
   c. adding to the separated pith a dietary supplement for the livestock.

2. The process of claim 1 wherein the dietary supplement includes a nitrogenous protein substitute, a leguminous meal and a mineral mix.

3. A process for producing ruminant livestock feed from sugarcane, the sugarcane having as components a highly lignified outer rind region including outer rind fibers, epidermis and was covering the outer rind region, and an interior of pith containing naturally present sugar juice, which process comprises:
   a. splitting sugarcane stalk parallel to a longitudinal axis of the stalk while retaining substantially all of the naturally present sugar juice in the pith;
   b. scraping the pith away from the outer rind region of the sugarcane stalk including the outer rind fibers, wax and epidermis, while retaining substantially all of the naturally present sugar juice in the pith; and
   c. adding to the separated pith:
      i. a protein substitute comprising from about 1 to about 20 percent urea;
      ii. 10 to 90 percent of a meal selected from the group consisting of soybean, clover, peas, peanuts, beans and alfalfa, and
      iii. 5 to 50 percent of a mineral mix whereby additional nutrient supplement comprising basic constituents necessary to insure natural growth of the ruminant livestock is supplied.

4. A process for providing livestock with a feed from sugarcane, the sugarcane having as components a highly lignified outer rind region including outer rind fibers, epidermis and wax covering the outer rind region, and an interior of pith containing naturally present sugar juice, which process comprises:

a. splitting sugarcane stalk parallel to a longitudinal axis of the stalk while retaining substantially all of the naturally present sugar juice in the pith;

b. scraping the pith away from the outer rind region of the sugarcane stalk including the outer rind fibers, wax and epidermis, while retaining substantially all of the naturally present sugar juice in the pith; and c. feeding the separated pith containing substantially all of the naturally present sugar juice to livestock.

* * * * *